(12) United States Patent
Keen et al.

(10) Patent No.: US 9,920,968 B2
(45) Date of Patent: Mar. 20, 2018

(54) VARIABLE PID ENABLE FOR COMPRESSOR CONTROL ALGORITHM

(71) Applicant: Continental Automotive Systems, Inc., Auburn Hills, MI (US)

(72) Inventors: Elliott David Keen, West Bloomfield, MI (US); Mark Phillip Roden, Waterford, MI (US); Shannon Marie Shaw, Rochester, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 464 days.

(21) Appl. No.: 14/286,490

(22) Filed: May 23, 2014

(65) Prior Publication Data

US 2014/0250928 A1   Sep. 11, 2014

Related U.S. Application Data

(63) Continuation of application No. 12/723,887, filed on Mar. 15, 2010, now abandoned.

(51) Int. Cl.
*G06F 19/00* (2011.01)
*F25B 49/02* (2006.01)
*B60H 1/32* (2006.01)

(52) U.S. Cl.
CPC ......... *F25B 49/022* (2013.01); *B60H 1/3216* (2013.01); *F25B 49/025* (2013.01); *B60H 2001/3261* (2013.01); *B60H 2001/3272* (2013.01); *F25B 2600/0253* (2013.01)

(58) Field of Classification Search
USPC .................................................. 700/32; 62/36
See application file for complete search history.

(56) References Cited

U.S. PATENT DOCUMENTS

| | | | |
|---|---|---|---|
| 6,038,871 A * | 3/2000 | Gutierrez | B60H 1/3216 236/78 D |
| 6,089,034 A * | 7/2000 | Lake | B60H 1/00907 62/204 |
| 7,100,387 B2 | 9/2006 | Boer et al. | |
| 7,249,882 B2 | 7/2007 | Lin | |
| 7,591,143 B2 * | 9/2009 | Zeigler | B60H 1/00378 162/202 |
| 7,762,094 B2 | 7/2010 | Iwaki | |
| 2005/0120740 A1 | 6/2005 | Enomoto | |
| 2006/0213208 A1 | 9/2006 | Iwaki et al. | |
| 2007/0277544 A1 * | 12/2007 | Honda | B60H 1/321 62/228.3 |

* cited by examiner

*Primary Examiner* — Kidest Bahta

(57) ABSTRACT

A control system, which may be a Proportional Integral Derivative (PID) control system, controls a component by adjusting the control input and the execution of the control output whenever a change in a state of a component exceeds a certain value. A method is also described.

3 Claims, 2 Drawing Sheets

VARIABLE PID ENABLE FOR COMPRESSOR CONTROL ALGORITHM

CROSS-REFERENCE TO RELATED APPLICATIONS

This application is a continuation of U.S. application Ser. No. 12/723,887, filed on Mar. 15, 2010, which is incorporated by reference herein in its entirety.

BACKGROUND

The present disclosure is directed to control systems, and more specifically to a proportional integral derivative (PID) evaporator temperature control scheme.

In the automotive field, as well as other fields, compressors are used to control an evaporator temperature and thereby allow for heating and cooling. The evaporator temperature is typically adjusted by changing the compressor speed. In order to ensure that the compressor is operated at the proper speed for a desired evaporator temperature, electrical control systems are used. It is known in the art to use a proportional integral derivative (PID) control scheme on a micro-controller to control these systems. Typically the PID controller will have an input of the current temperature of the evaporator and the current speed of the compressor. The PID controller then attempts to drive the evaporator temperature to a desired temperature by making corresponding adjustments to the compressor speed.

Current control systems determine adjustments to the compressor speed at a set frequency. By way of example, some control algorithms recalculate the needed compressor speed every 8 seconds, or at some desired time interval. Adjusting the compressor speed at a set frequency entails operating the control algorithm at the specific time interval regardless of any change in the actual temperature of the evaporator. Once the evaporator temperature has reached approximately the desired temperature minor fluctuations in temperature can occur with the evaporator temperature remaining within acceptable tolerances. Running the control scheme, and adjusting the compressor speed, consistently at the desired frequency can therefore result in unnecessary adjustments to the compressor speed, and unneeded use of electrical power.

SUMMARY

In one form, which may be combined with or separate from the other forms disclosure herein, disclosed is a control system for operating a compressor that establishes an initial condition, detects changes in the initial condition, and operates a controller when the changes in the initial condition exceed a predetermined maximum value. The controller then establishes a new initial condition and continues to detect changes from the new initial condition.

In another form, which may be combined with or separate from the other forms disclosed herein, additionally disclosed is a control scheme for controlling a compressor speed which establishes a target evaporator temperature and an initial evaporator temperature. The method detects the actual temperature of the evaporator and compares it to a previous sensed evaporator temperature to determine a change in evaporator temperature since the last iteration of the control signal. The method also detects the actual evaporator temperature and compares the actual temperature with the target temperature to determine a difference between the actual temperature and the target temperature. The difference between the actual temperature and the target temperature is used to initiate operation of a control algorithm whenever the change in temperature exceeds the predetermined value. Initiating operation when the temperature change exceeds a predetermined value provides for actuation of the control algorithm to adjust the speed of the compressor only when required to obtain a desired temperature.

These and other features of the present invention can be best understood from the following specification and drawings, the following of which is a brief description.

DESCRIPTION

Figure 1:
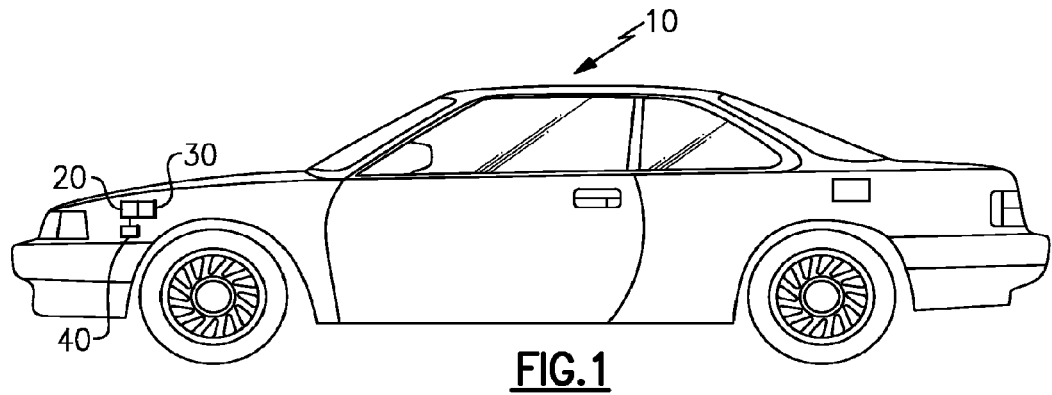
FIG. 1 schematically illustrates a vehicle which has a compressor, evaporator, and a compressor controller, in accordance with the principles of the present disclosure.

FIG. 1 schematically illustrates a vehicle 10 which has a compressor 20 and an evaporator 30 located in the front engine compartment. The evaporator 30 and the compressor 20 are controlled by an on-board electronic controller 40 which is capable of adjusting the speed of the compressor 20 and thereby adjusting the temperature of the evaporator 30. The controller 40 can be a micro-processor located within the standard control system of the vehicle, or any other type of controller. The example compressor 20 is controlled by a proportional integral derivative (PID) control scheme.

Figure 2:
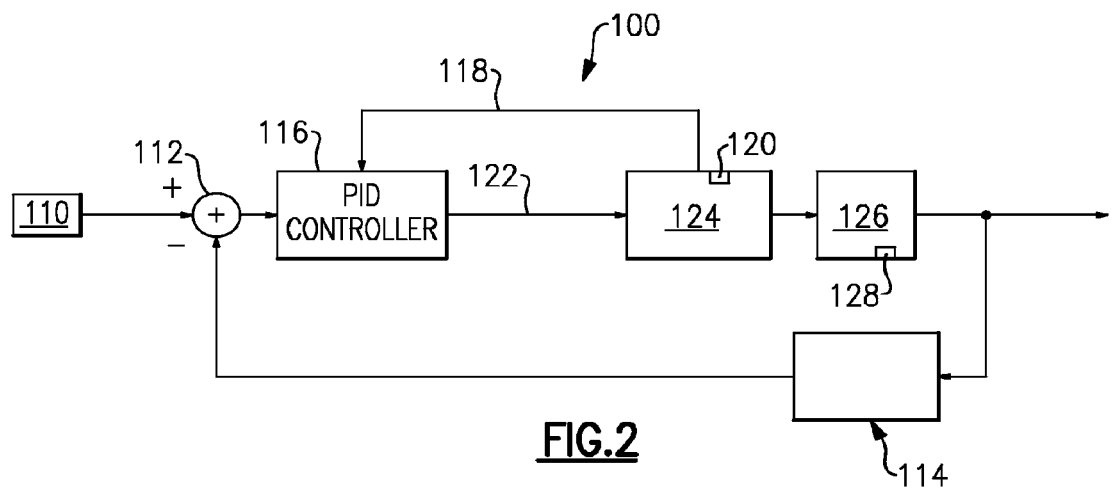
FIG. 2 illustrates a block flowchart of a compressor control system using a proportional integral derivative controller (PID controller), according to the principles of the present disclosure.

FIG. 2 illustrates a flowchart of a control scheme 100 for controlling an evaporator temperature 114 by adjusting the compressor speed 118. Initially a target evaporator temperature 110 is either input into the system 100, or manufactured into the controller 40 operating the control scheme 110. A summation block 112 subtracts an actual evaporator temperature 114 from the target temperature 110, and transfers the resultant value into a PID controller 116. The PID controller 116 also accepts an input of an actual compressor speed 118 which is determined by a compressor speed sensor 120. When the PID controller 116 performs a control cycle, it outputs a command 122 which pushes the compressor 124 toward the desired compressor speed 118. The compressor speed 118 affects the evaporator temperature 114 in a predictable manner. For example, an increase in compressor speed causes a change in evaporator temperature in one direction, and a decrease in evaporator speed will cause a temperature movement in the other direction.

The evaporator temperature 114 is sensed by a sensor 128, which outputs the evaporator temperature 114. The example control system shown in FIG. 2 includes a condition check within the evaporator temperature block 114. The condition check evaluates a specific condition, such as evaporator temperature, and determines how much the condition has changed since the last control cycle. A control cycle is a single iteration of the control scheme 100 which determines an adjustment to the compressor speed using the control scheme 100. If the change in condition exceeds a predefined amount, a control cycle is performed.

The control system 100, utilizes a double feedback loop, in that it uses the current evaporator temperature 114 compared with the target evaporator temperature 110 as one input into the PID controller 116. The control scheme 100 also utilizes the current compressor speed 118 as a second input into the PID controller 116. The feedback loops ensure that as the temperature of the evaporator approaches that of the desired target temperature 110, a progressively smaller input is sent to the PID controller 116, thereby causing the PID controller 116 to perform a smaller adjustment to the compressor speed 118.

Figure 3:
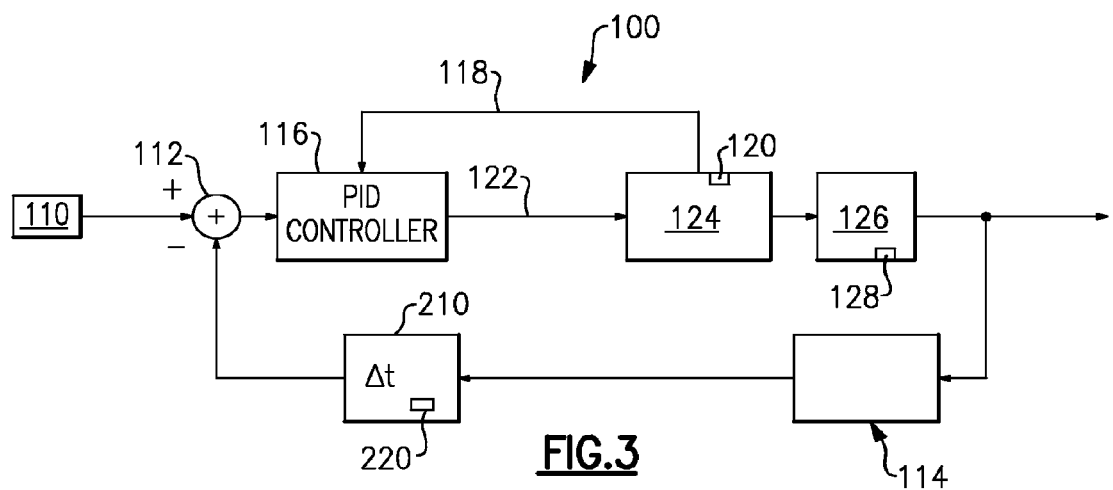
FIG. 3 illustrates a block flowchart of another compressor control system having an additional Δt check block, in accordance with the principles of the present disclosure.

FIG. 3 illustrates the example control system 100 of FIG. 1, with a separate Δt check block 210. Δt represents the difference between the current evaporator temperature 114 and the evaporator temperature 114 from the previous evaporator temperature data reading from the evaporator temperature sensor. The Δt check block 210 prevents the PID controller 116 from operating whenever Δt is below a predetermined value. This allows the PID controller 210 to recalculate a desired compressor speed 122 only when a speed correction is necessary. Each time the Δt check block 210 passes a value to the summation block 112, it also stores that value as an "initial value." The initial value is then compared to the incoming sensed evaporator temperature 114 to determine the Δt value. When the Δt value exceeds a predetermined Δt value, the Δt check block 210 passes the current evaporator temperature 114 to the summation block 112, and the PID controller 116 operates a control iteration.

Alternatively, a timing component 220 can be utilized to prompt operation of a control iteration, in addition to a change in condition prompting the control cycle, as is indicated in the Δt check block 210. The timing component 220 determines how much time has passed since a value has been passed to the summation block 112. If a predetermined maximum time has elapsed, the actual evaporator temperature 114 is passed to the summation block 112 regardless of the Δt value. By way of example, the maximum time could be set to three minutes, thereby ensuring that the control scheme is operated at least every three minutes. This allows the control system 100 to make minor necessary adjustments to the compressor speed 118, without constant unnecessary adjustments to the compressor speed 118.

Figure 4:
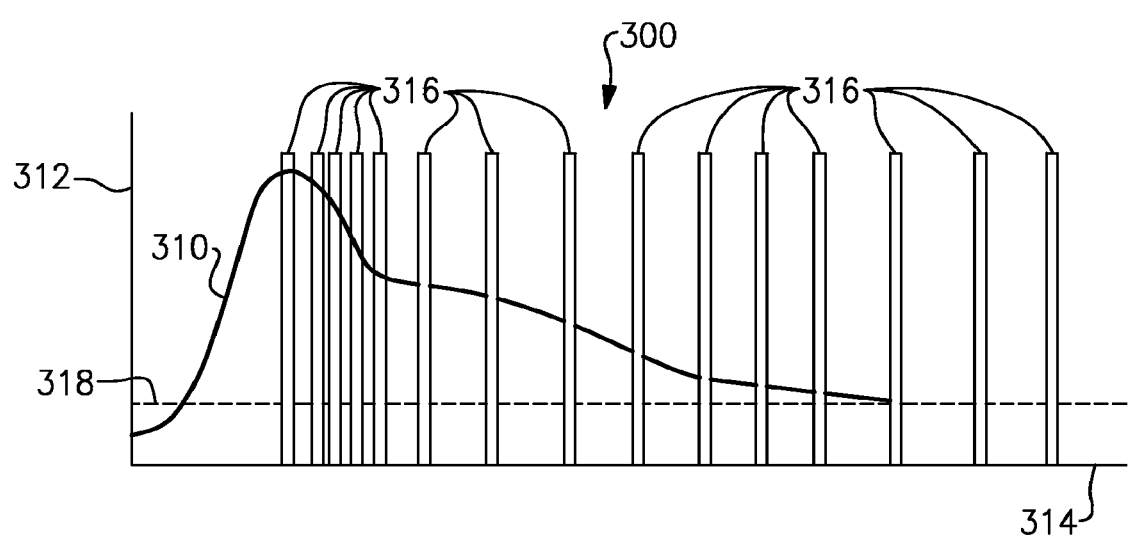
FIG. 4 illustrates a sample graph of an evaporator temperature over time, according to the principles of the present disclosure.

Illustrated in FIG. 4 is a sample graph 300 of evaporator temperature control operations using the above described system. In the graph 300, the line 310 represents the temperature of the evaporator over time, the axis 312 represents temperature, and the axis 314 represents time. Each of the bars 316 represent a control cycle which is run by the controller. Since the controller uses the Δt value to determine when to operate a control cycle, that is the control cycle is only run when Δt is greater than a certain number, the bars are closer together at the beginning of the time period when the temperature is changing at the fastest rate. As the time progresses and the temperature changes at a slower rate, the Δt minimum is not exceeded for longer periods, and the control cycles 316 are spaced farther apart. By the end of the time period the evaporator temperature 310 has reached the desired temperature line 318. The example system illustrated here includes the optional maximum time element described above, and as such the latest three control cycles 316 are evenly distributed and were initiated because a maximum time had elapsed since the last control cycle 316.

An example of the above described system uses the control scheme to drive an evaporator temperature to a desired value by adjusting a compressor speed. The system initially detects an actual evaporator temperature when it is first turned on, and this temperature is set as the initial operating condition. The control system then polls the evaporator temperature and compares actual temperatures to the initial operating condition. When the difference between the two values exceeds a predefined amount, the control scheme operates one cycle of the PID controller. The PID controller accepts the evaporator temperature as a control input and determines an adjustment to the compressor speed which is necessary to drive the evaporator temperature to the desired value. The controller then resets the "initial operating condition" to be the actual operating condition at the start of the control cycle, and the system returns to polling the actual evaporator temperature.

Although an example embodiment has been disclosed, one having ordinary skill in this art would recognize that certain modifications would come within the scope of this invention. For that reason, the following claims should be studied to determine the true scope and content of this invention.

What is claimed is:

1. A method for controlling the speed of a compressor in an air conditioning system, the air conditioning system also having an evaporator coupled to the compressor, a proportional integral derivative controller (hereafter a "PID controller") coupled to the compressor and configured to control the compressor's speed, the air conditioning system also having an evaporator temperature sensor coupled to the evaporator and to the PID controller, the method comprising:

providing a target evaporator temperature to the PID controller;

determining an actual evaporator temperature while the compressor is operating at a first speed;

providing a first input signal to the PID controller, which represents a difference between the target evaporator temperature and the actual evaporator temperature while the compressor is operating at the first speed;

providing a second input signal to the PID controller, which represents the first speed of the compressor at the actual evaporator temperature;

calculating a second, desired speed of the compressor by the PID controller responsive to and proportional to the difference between the target evaporator temperature and the actual evaporator temperature at the first compressor speed; and causing the compressor to change its speed from the first speed to the second speed.

2. The method of claim 1, wherein the step of causing the compressor to change its speed from the first speed to the second speed occurs only when the difference between the target evaporator temperature and the actual evaporator temperature while the compressor is operating at a first speed, differs by an amount that is greater than a predetermined threshold value.

3. The method of claim 1, further comprising the step of controlling the time between execution of the step of causing the compressor to change its speed from the first speed to the second speed.

* * * * *